(12) United States Patent
Au et al.

(10) Patent No.: US 7,747,609 B1
(45) Date of Patent: Jun. 29, 2010

(54) USING A CORRELATION FACTOR TO DERIVE JOIN COSTING STATISTICS

(75) Inventors: Grace K. Au, Rancho Palos Verdes, CA (US); Bibhu Ranjan Priyadarshi, El Segundo, CA (US); Ramakrishna Korlapati, El Segundo, CA (US); Sanjay Sukumaran Nair, El Segundo, CA (US)

(73) Assignee: Teradata US, Inc., Miamisburg, OH (US)

( * ) Notice: Subject to any disclaimer, the term of this patent is extended or adjusted under 35 U.S.C. 154(b) by 362 days.

(21) Appl. No.: 11/963,324

(22) Filed: Dec. 21, 2007

(51) Int. Cl.
*G06F 17/30* (2006.01)

(52) U.S. Cl. ............................... 707/714; 707/E17.132

(58) Field of Classification Search .................. 707/2–4, 707/100
See application file for complete search history.

(56) References Cited

U.S. PATENT DOCUMENTS

| | | | | |
|---|---|---|---|---|
| 5,960,428 A | * | 9/1999 | Lindsay et al. | 707/4 |
| 7,127,457 B1 | * | 10/2006 | Ghazal | 707/4 |
| 7,260,563 B1 | * | 8/2007 | Priyadarshi et al. | 707/2 |
| 7,330,848 B2 | * | 2/2008 | Chaudhuri et al. | 707/3 |
| 2007/0067262 A1 | * | 3/2007 | Ramesh et al. | 707/2 |

* cited by examiner

*Primary Examiner*—Cheryl Lewis
(74) *Attorney, Agent, or Firm*—Howard Spright

(57) ABSTRACT

Deriving join cost demographics for a binary join, i.e., a join between two relations each having a join column, includes using a correlation factor related to the ratio of unique join column values stored in each of a plurality of units of storage to the total number of unique values in the join column.

21 Claims, 5 Drawing Sheets

USING A CORRELATION FACTOR TO DERIVE JOIN COSTING STATISTICS

BACKGROUND

Users often extract information from database systems using a query (a query is one species of request). Queries often employ "joins" to find related information in two or more database tables (a table is one species of relation).

Database systems typically include an optimizer which is tasked with finding the optimum strategy for executing a request. Typically, one part of that task is finding an optimum strategy for executing a join. Optimizers often use join costing statistics to find the optimum strategy for executing the join.

Determining join costing statistics can be challenging when tables are distributed among a number of data-storage facilities and/or partitions.

SUMMARY

In general, in one aspect, the invention features a method for deriving join cost demographics for a binary join in a query. The binary join is between a first relation having a first join column and a second relation having a second join column. The method includes determining a number ("$A_1$") of unique first join column values stored in each of a first plurality of units of storage. The method further includes determining a correlation factor ("$C_1$") related to the ratio of $A_1$ to the total number of unique values in the first join column. The method further includes determining a number ("$A_2$") of unique second join column values stored in each of a second plurality of units of storage. The method further includes determining a correlation factor ("$C_2$") related to the ratio of $A_2$ to the total number of unique values in the second join column. The method further includes adjusting $C_1$ and $C_2$ by a number of units of storage that are qualified to participate in the binary join. The method further includes determining a number ("$B_1$") of first join column values that will participate in the binary join based on $A_1$. The method further includes determining a number ("$B_2$") of second join column values that will participate in the binary join based on $A_2$. The method further includes selecting the smaller of $B_1$ and $B_2$ as $B_f$ which is the number of join column values that will find a match in the binary join. The method further includes adjusting $B_f$ by $C_1$ and $C_2$. The method further includes storing $A_1$, $A_2$ and $B_f$ as join cost demographics for the two join columns.

Implementations of the invention may include one or more of the following. The unit of storage may include the memory associated with one of a plurality of processing modules. The unit of storage may include one of a plurality of partitions. Determining $A_1$ may include estimating $A_1$ using join column demographics. Determining $A_1$ may include estimating $A_1$ using a stochastic model. The method may further include adjusting $A_1$ by a single-table condition in the query. The method may further include adjusting $A_1$ by a factor selected from a group that includes $C_1$ and $C_2$.

In general, in another aspect, the invention features a database system. The database system includes one or more nodes. The database system includes a plurality of CPUs, each of the one or more nodes providing access to one or more CPUs. The database system includes a plurality of virtual processes, each of the one or more CPUs providing access to one or more virtual processes. The database system includes each virtual process being configured to manage data, including rows from the set of database table rows, stored in one of a plurality of data-storage facilities. The database system includes a process configured to derive join cost demographics for a binary join in a query. The binary join is between a first relation having a first join column and a second relation having a second join column. The process determines a number ("$A_1$") of unique first join column values stored in each of a first plurality of units of storage. The process determines a correlation factor ("$C_1$") related to the ratio of $A_1$ to the total number of unique values in the first join column. The process determines a number ("$A_2$") of unique second join column values stored in each of a second plurality of units of storage. The process determines a correlation factor ("$C_2$") related to the ratio of $A_2$ to the total number of unique values in the second join column. The process adjusts $C_1$ and $C_2$ by a number of units of storage that are qualified to participate in the binary join. The process determines a number ("$B_1$") of first join column values that will participate in the binary join based on $A_1$. The process determines a number ("$B_2$") of first join column values that will participate in the binary join based on $A_2$. The process selects the smaller of $B_1$ and $B_2$ as $B_f$. The process adjusts $B_f$ by $C_1$ and $C_2$. The process stores $A_1$, $A_2$, and $B_f$ as join cost demographics for the two join columns.

In general, in another aspect, the invention features a computer program, stored in a tangible medium, for deriving join cost demographics for a binary join in a query. The binary join is between a first relation having a first join column and a second relation having a second join column. The program comprises executable instructions that cause a computer to determine a number ("$A_1$") of unique first join column values stored in each of a first plurality of units of storage. The program further comprises executable instructions that cause a computer to determine a correlation factor ("$C_1$") related to the ratio of $A_1$ to the total number of unique values in the first join column. The program further comprises executable instructions that cause a computer to determine a number ("$A_2$") of unique second join column values stored in each of a second plurality of units of storage. The program further comprises executable instructions that cause a computer to determine a correlation factor ("$C_2$") related to the ratio of $A_2$ to the total number of unique values in the second join column. The program further comprises executable instructions that cause a computer to adjust $C_1$ and $C_2$ by a number of units of storage that are qualified to participate in the binary join. The program further comprises executable instructions that cause a computer to determine a number ("$B_1$") of first join column values that will participate in the binary join based on $A_1$. The program further comprises executable instructions that cause a computer to determine a number ("$B_2$") of first join column values that will participate in the binary join based on $A_2$. The program further comprises executable instructions that cause a computer to select the smaller of $B_1$ and $B_2$ as $B_f$. The program further comprises executable instructions that cause a computer to adjust $B_f$ by $C_1$ and $C_2$. The program further comprises executable instructions that cause a computer to store $A_1$, $A_2$, and $B_f$ as join cost demographics for the two join column.

DETAILED DESCRIPTION

Figure 1:
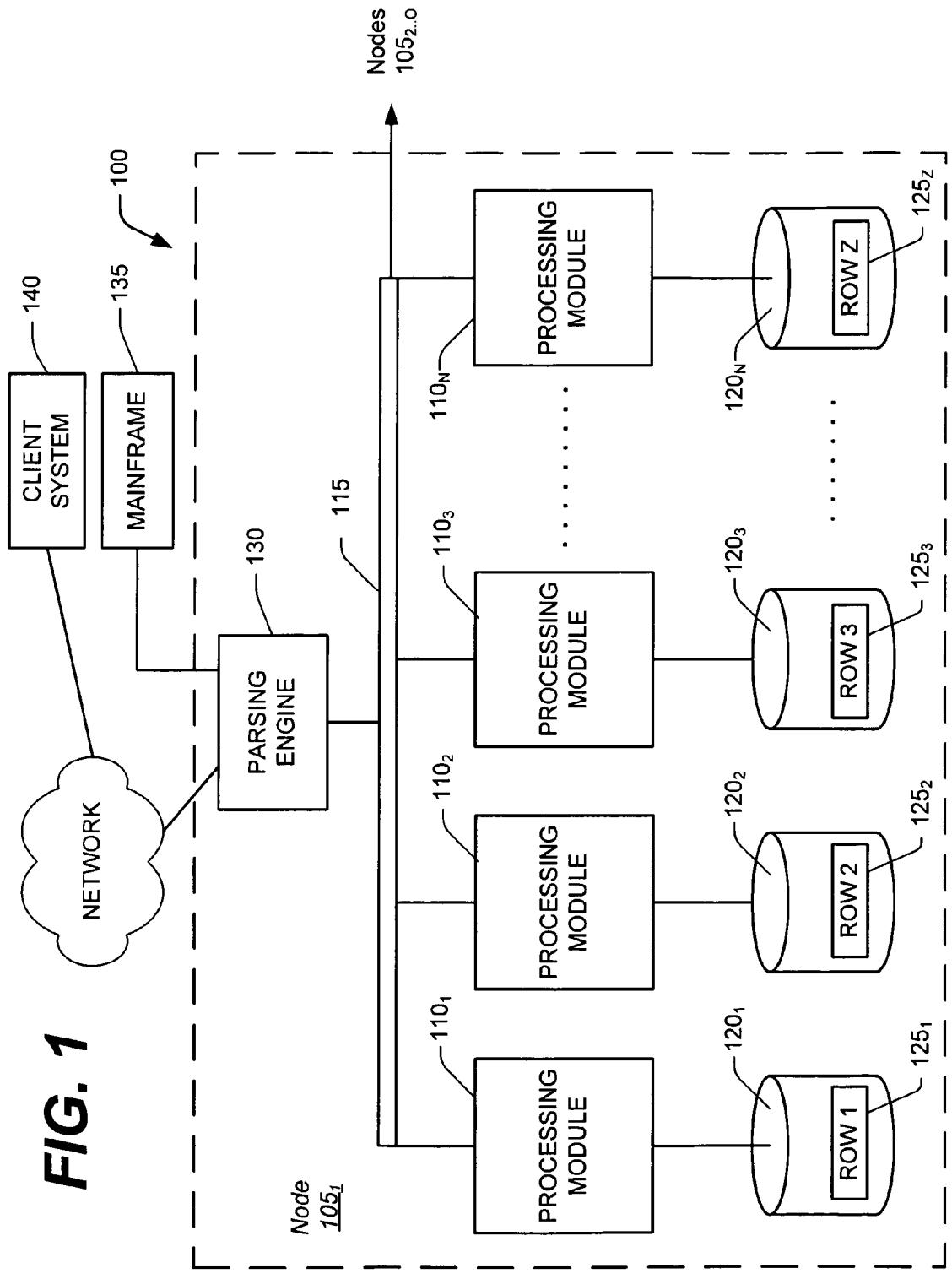
FIG. 1 is a block diagram of a node of a database system.

The database row storage technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node 105$_1$ of the DBS 100. The DBS node 105$_1$ includes one or more processing modules 110$_{1 \ldots N}$, also referred to as AMPs, connected by a network 115, that manage the storage and retrieval of data in data-storage facilities 120$_{1 \ldots N}$. Each of the processing modules 110$_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules 110$_{1 \ldots N}$ manages a portion of a database that is stored in a corresponding one of the data-storage facilities 120$_{1 \ldots N}$. Each of the data-storage facilities 120$_{1 \ldots N}$ includes one or more disk drives. The DBS may include multiple nodes 105$_{2 \ldots N}$ in addition to the illustrated node 105$_1$, connected by extending the network 115.

The system stores data in one or more tables in the data-storage facilities 120$_{1 \ldots N}$. The rows 125$_{1 \ldots Z}$ of the tables are stored across multiple data-storage facilities 120$_{1 \ldots N}$ to ensure that the system workload is distributed evenly across the processing modules 110$_{1 \ldots N}$. A parsing engine 130 organizes the storage of data and the distribution of table rows 125$_{1 \ldots Z}$ among the processing modules 110$_{1 \ldots N}$. The parsing engine 130 also coordinates the retrieval of data from the data-storage facilities 120$_{1 \ldots N}$ in response to queries received from a user at a mainframe 135 or a client computer 140. The DBS 100 usually receives queries and commands to build tables in a standard format, such as SQL.

In one implementation, the rows 125$_{1 \ldots Z}$ are distributed across the data-storage facilities 120$_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities 120$_{1 \ldots N}$ and associated processing modules 110$_{1 \ldots N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
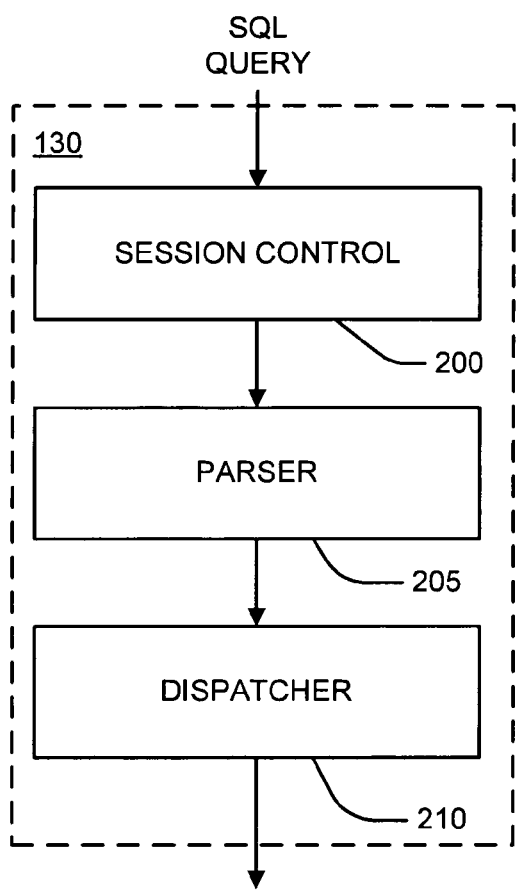
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
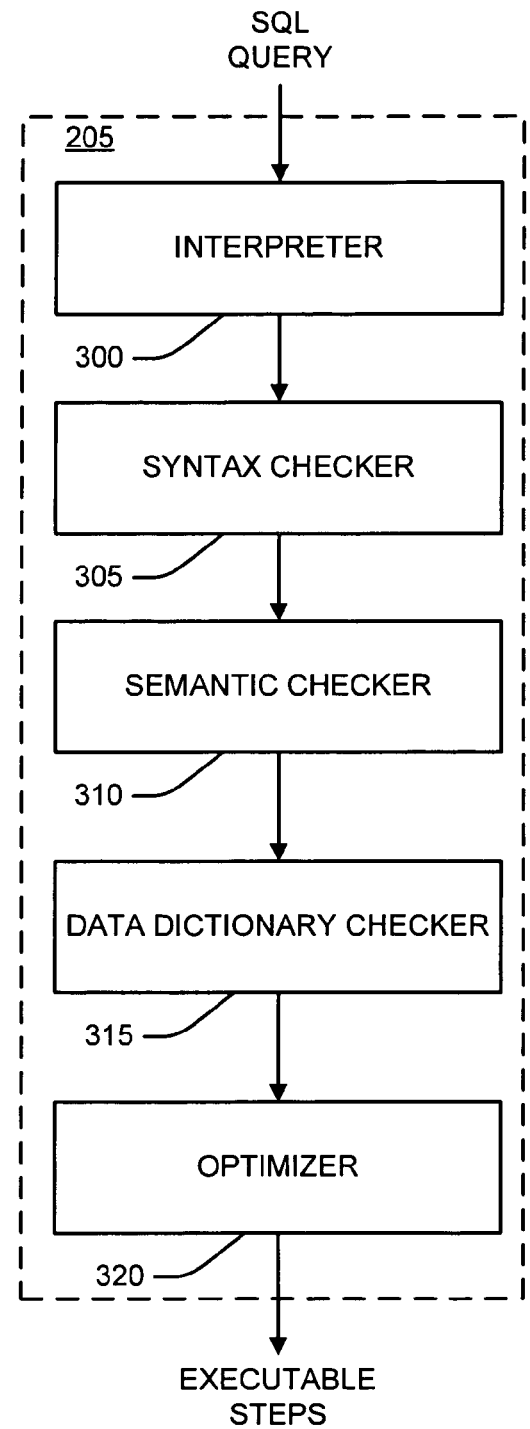
FIG. 3 is a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request.

Figure 4:
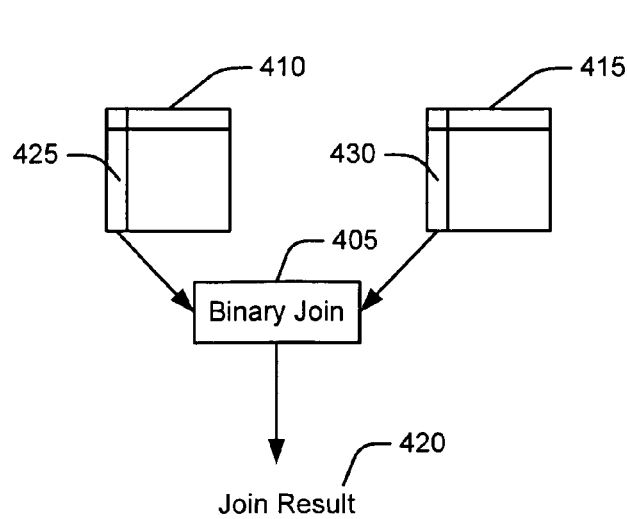
FIG. 4 illustrates a binary join.

A binary join, illustrated in FIG. 4, is a process 405 that follows a binary join plan to join two relations (or tables) 410, 415 to produce a join result 420. A join column 425, 430 is specified in each of the relations 410, 415, respectively.

In a massively parallel processing ("MPP") system, a binary join plan is defined by the join strategy or geography of the input relations. The geography indicates if and how the input rows should be relocated. For example, one join strategy is to duplicate the set of input rows from the left relation involved in the binary join on every AMP 110$_{1 \ldots N}$ without relocating the set of input rows from the right relation involved in the binary join. Another join strategy is to redistribute the sets of input rows from both relations involved in the binary join based on their respective join columns so that rows with the same join value from both input relations are co-located in the same AMP.

Join strategy can be described using a "{left, right}" notation, where "left" refers to the geography of the left relation in the binary join and "right" refers to the geography of the right relation in the binary join. Geographies include: (1) "duped"—the set of input rows from the designated relation are duplicated on every AMP; (2) "direct"—the set of input rows from the designated relation are not relocated and are accessed directly from the relation; (3) "local"—same as direct except that selected columns from selected input rows are moved into a temporary location, such as a temporary file or a spool file; and (4) "hash"—the set of input rows are redistributed based on a hash of the join column. The first example in the previous paragraph is a {duped, direct} or {duped, local} join strategy. The second example in the previous paragraph is a {hash, hash} join strategy.

Figure 5:
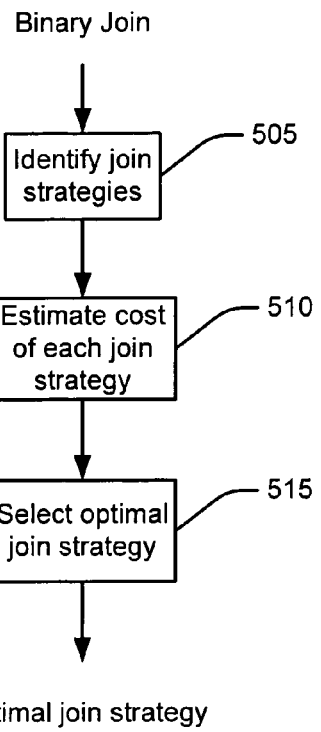
FIG. 5 is a flow chart for finding the optimal join strategy for a binary join.

The optimizer identifies the join strategies that could be used to execute the binary join (block 505), as shown in FIG. 5. It then estimates the cost of each of the join strategies (block 510) and selects the optimal (typically the lowest cost) join strategy (block 515).

Figure 6:
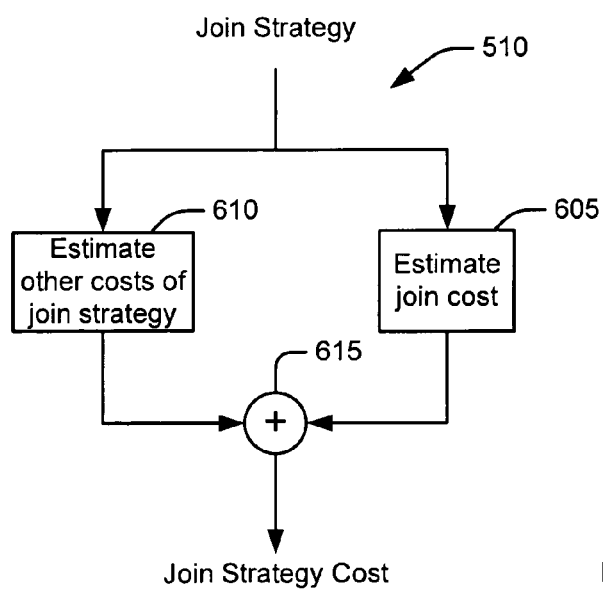
FIG. 6 is a flow chart for estimating the cost of each join strategy.

The process of estimating the cost of each of the join strategies, illustrated in FIG. 6 for one join strategy, requires estimating the cost of the join (block 605), estimating the other costs of the join strategy (block 610), and combining the two costs (block 615).

Figure 7:
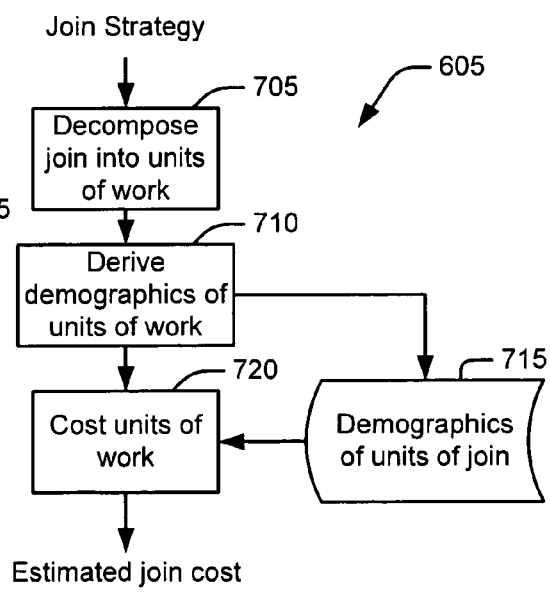
FIG. 7 is a flow chart for estimating a join cost.

The join cost is estimated, as shown in FIG. 7, by decomposing the join into the units of work performed by the execution engine (block 705), deriving demographics for those units of work (block 710), and storing the derived demographics in a demographics of units of join memory 715. The cost of each unit of work is then estimated (block 720).

For a non-partitioned table, a unit of work is the join performed on the portion of data located in one AMP. For a partitioned table, a unit of work is the join performed on one partition of data in one AMP. Join costing therefore involves determining the demographics of one unit of join. The demographics that are needed include the number of rows, the number of values in the join columns and the number of values that have match.

Deriving AMP Level Demographics

Figure 8:
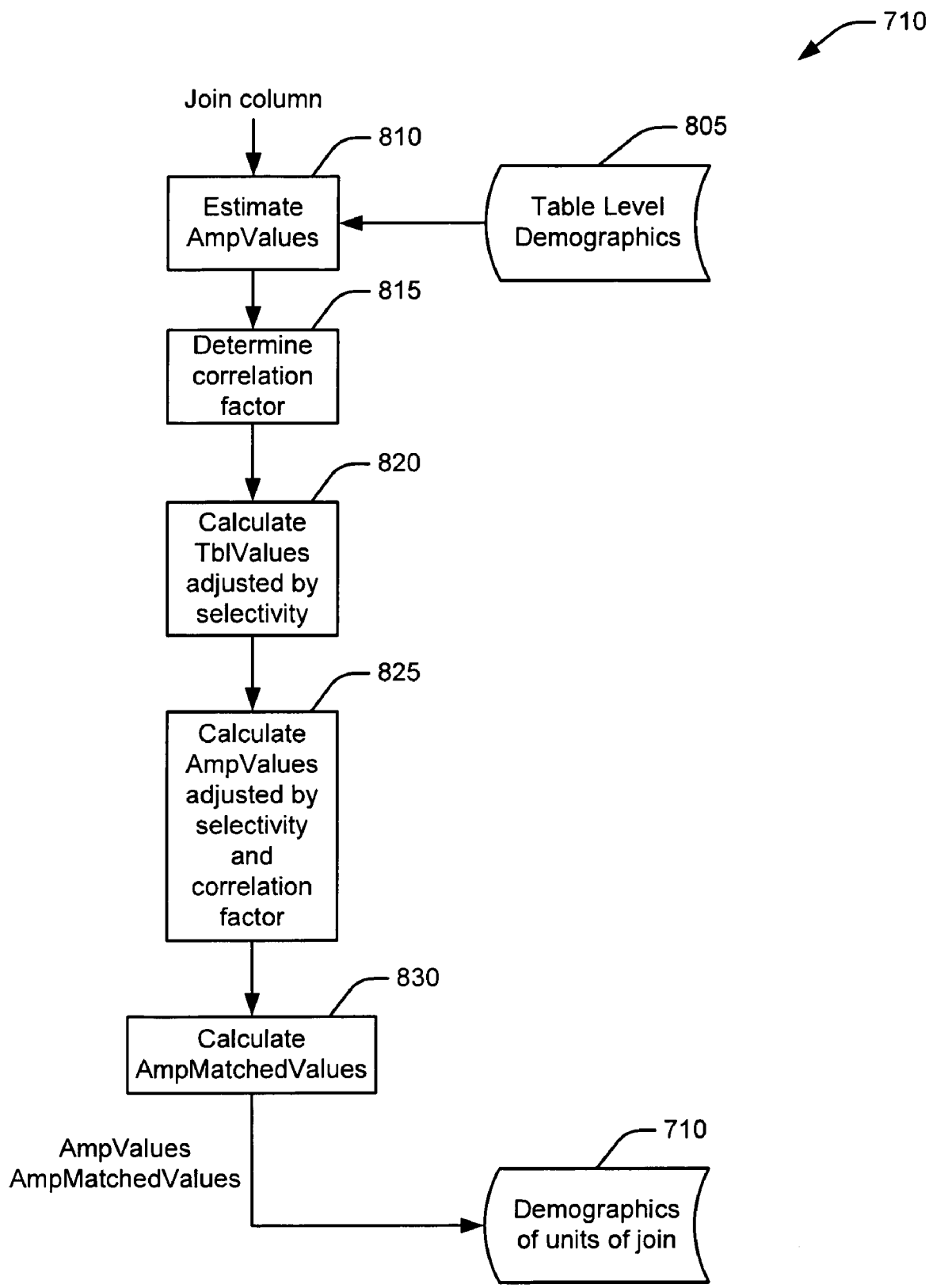
FIGS. 8 and 9 are flow charts of decomposing a join into units of work and deriving join cost demographics for those units of work using a correlation factor.

In one embodiment, for deriving demographics for the units of work in a join (block 710) of non-partitioned tables, illustrated in FIG. 8, a unit of work is the join of the portion of data in one AMP. In one embodiment, the cost of this unit of work is determined using the following AMP level demographics of the two join columns 425, 430 (one from each of the input relations):

AmpValues—number of unique values in the join column participating in the join in each AMP AmpMatchedValues—number of values that will find a match in the join in each AMP.

In one embodiment, table level demographics 805 are obtained from the statistics collected on the data which include the number of rows (TblRows) and number of unique values in a column or set of columns (TblValues). In one embodiment, these table level demographics 805, if they exist, are used to estimate AmpValues (block 810). In one embodiment, for a Primary Index (PI) column, TblValues are assumed to be evenly divided among the AMPs. However, the same assumption may not hold for non-PI column. In one embodiment, for non-PI column(s), the AmpValues is determined in one of two ways:

1. If the AvgAmpRPV (average per–AMP rows per value) information is available in the statistics, AmpRows=TblRows/#Amps AmpValues=AmpRows/AvgAmpRPV 2. If the AvgAmpRPV information is not available, use a stochastic model to estimate AmpValues. One possible model is based on the Poisson distribution whereby the probability of a value landing in an AMP is a function of the total number of AMPs and the number of rows per value (RPV):

InAmpProb=1−$pow$((#Amps−1)/#Amps,RPV)

AmpValues=TblValues*InAmpProb

In one embodiment a correlation factor, Vals2 AmpCF, is then computed as a ratio between the AmpValues and the TblValues (block 815).

Vals2AmpCF=AmpValues/TblValues

In one embodiment, Vals2 AmpCF actually represents how TblValues are divided among the AMPs. It may be used to derive AMP level demographics specific for each join strategy. One application is in a {duped, local} join strategy where one table is duplicated on every AMPs and the other table is spooled locally in the primary AMPs. When there are single-table conditions on the table with local geography, only rows that satisfy the single-table conditions are spooled. If there is correlation between the condition column and join column or the selection condition is very selective, it is possible for the original TblValues in the join column to be reduced to TblValuesSel (Block820). In that case, in one embodiment, the number of AMP level values in the join column after selection is re-computed as follows (block 825):

AmpValuesSel=TblValuesSel*Vals2AmpCF

For example, assume that the binary join in the following query is being optimized:

Sel*from product P, sales S
    where P.prod_code=S.prod_code
    and P.category=X
    and S.sales_date between 'Dec. 1, 2006' and 'Dec. 31, 2006';

and that,

TblValues(S.prod_code)=5000
    RPV(S.prod_code)=200
    #Amps=100

Assume that the product table is the left table, the sales table is the right table and that a {duped, local} join strategy is being evaluated. Using a stochastic model, AmpValues of S.prod_code is estimated to be 4330. Therefore, Vals2AmpCF(S.prod_code)=4330/5000=0.866

Assume further that after applying the sales_date condition, only 1000 of the prod_code values survive in the qualified rows, i.e.

TblValuesSel(S.prod_code)=1000

Therefore, $$AmpValuesSel(S.\text{prod\_code}) =$$
$$TblValuesSel(S.\text{prod\_code}) * Vals2AmpCF(S.\text{prod\_code}) =$$
$$1000 * 0.866 = 866$$

In one embodiment, AmpMatchedValues is then determined by taking the smaller of the AmpValues (or AmpValuesSel) of the two join columns (block 830).

Continuing with the above example, assume that:

TblValues(P.prod_code)=5000
    TblValuesSel(P.prod_code)=100

Since the qualified product rows are duplicated on all AMPs, the TblValuesSel of prod_code, 100, is also the AmpValuesSel of prod_code. To find the AmpMatchedValues, AmpValuesSel(P.prod_code) is compared with AmpValuesSel(S.prod_code) and the smaller of the two is taken. However, in this case, the entire AmpValuesSel(P.prod_code), 100, should not be used to compare with the AmpValuesSel(S.prod_code), 866. This is because not every of the S.prod_code exist in every AMP. The AmpValuesSel(P.prod_code) should first be adjusted by the Vals2 Amp2CF of S.prod_code as (100 *0.866)=86

The AmpMatchedValues for the {duped, local} join strategy is therefore 86. The same adjustment to the AmpValues of the duped table is needed for {duped, direct} join strategy. One embodiment of an algorithm for finding the AmpMatchValues of a {duped, local} or {duped, direct} join strategy (block 830) is shown below:

AdjustedAmpValues(DupedTable)=Amp Values
        (DupedTable)* Vals2AmpCF(OtherTable)

If (AdjustedAmpValues(DupedTable)<=Amp Values (OtherTable))

AmpMatchedValues=AdjustedAmpValues(Duped-
        Table);

else

AmpMatchedValues=Amp Values(OtherTable);

Deriving Partition Level Demographics

Figure 9:
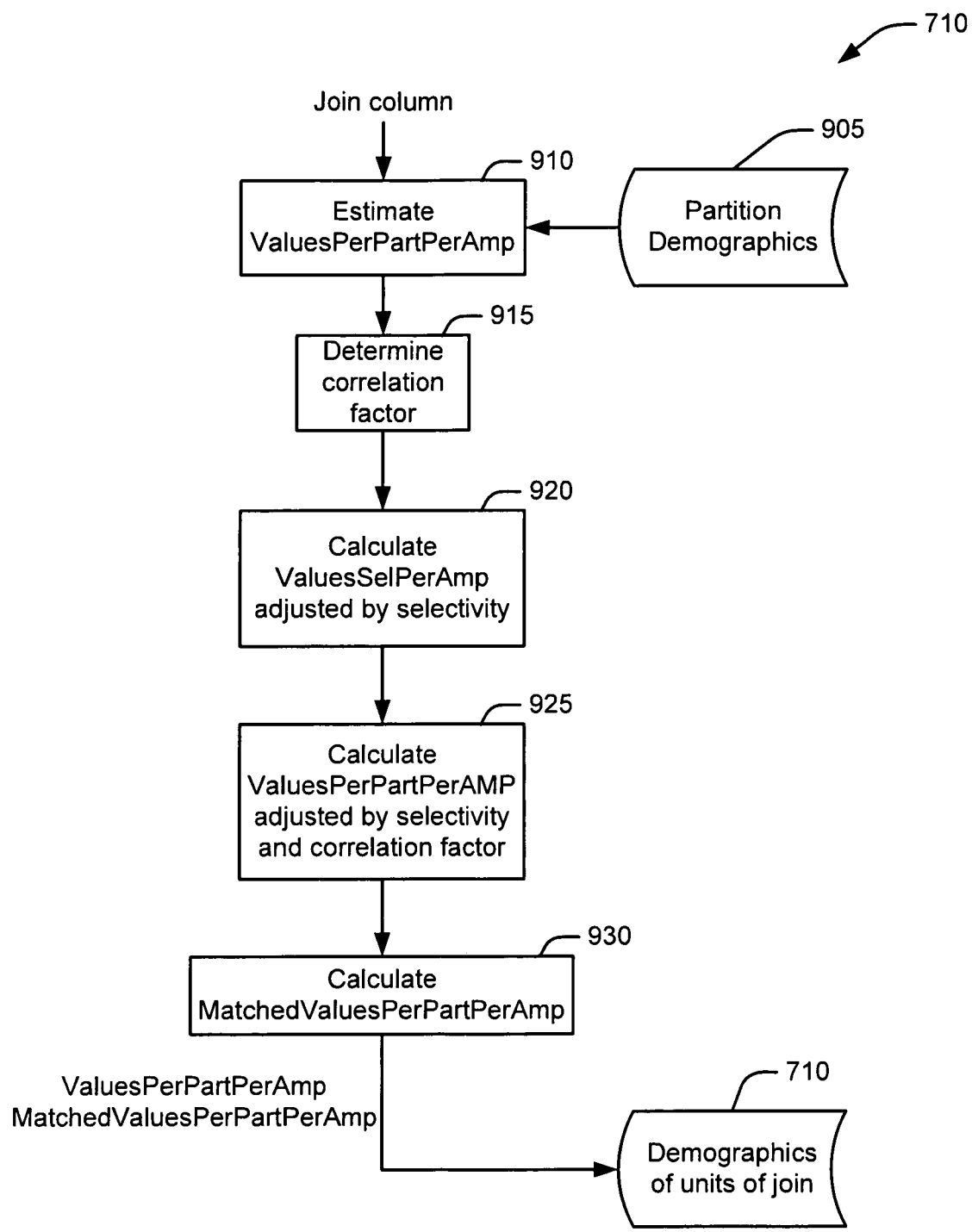

In another embodiment for deriving demographics for the units of work in a join (block 710), similar techniques are used to derive the partition level demographics of partitioned (PPI) tables for the costing of sliding window joins, as shown in FIG. 9. In a sliding window join, the PPI table is joined on its PI. Since the table is partitioned, a PI value may exist in multiple partitions. Therefore, the following partition level demographics are needed for the costing of a sliding window join:

- ValuesPerPartPerAmp—number of PI values in one partition participating in the join in one AMP
- MatchedValuesPerPartPerAmp—number of PI values that will find a match in the join in one AMP In one embodiment, partition statistics 905 are first accessed to obtain table level partition demographics. In one embodiment, the partition statistics, if they exist, are used to estimate ValuesPerPart. In one embodiment, statistics on the system column PARTITION contain the internal partition number of a row. Those statistics provide an accurate count of the non-empty partitions ("NEP") which is simply the number of values in the PARTITION column. Similarly, the number of values recorded in the multi-column statistics for the combined PARTITION column and PI column ($V_{mc}$) gives an accurate count of NEP times the number of PI values per partition. Therefore, the average number of PI values per partition (ValuesPerPart) can be computed as:

ValuesPerPart=$V_{mc}$/NEP

In one embodiment, in the absence of partition statistics, a stochastic model is used to estimate the average number of PI values distributed to a partition and that value is used as ValuesPerPart. Similar to the estimation of AmpValues, the probability of a PI value landing in a partition is a function of the total number of partitions and RPV of the PI:

InPartProb=1−$pow$((#Parts−1)/#Parts,RPV)

ValuesPerPart=PIValues*InPartProb

In one embodiment, since PI is the key used to redistribute rows across the AMPs, it is assumed that the values in a PI are evenly divided among the AMPs (block 910). Therefore, ValuesPerPartPerAmp=ValuesPerPart/#Amps In one embodiment, a correlation factor, PI2 Part CF, is computed (block 915) which represents how the PI values are divided among the partitions.

PI2Part CF=ValuesPerPart/PIValues

In one embodiment, when there are single-table conditions on the PPI table that can reduce the number of PI values, PI2 Part CF is used to re-compute a ValuesPerPartPerAmp. Let ValuesSelPerAmp be the number of PI values per AMP after selection (block 920). ValuesSelPerPartPerAmp, the number of values per partition per AMP after selection, is computed (block 925) as:

ValuesSelPerPartPerAmp=ValuesSelPerAmp*PI2Part CF

In one embodiment, the AmpMatchedValues is determined by taking the smaller of the AmpValues in each of the two join columns. In this case, AmpValues is simply (TblValues/#Amps). Then, AmpMatchedValues is adjusted to partition level using PI2 Part CF to derive Matched ValuesPerPartPerAmp. One embodiment of an algorithm for finding Matched-ValuesPerPartPerAmp (block 930) is shown below (using the notation Driver to refer to the table that drives the join and Probed to refer to the table being probed):

If the matched values come from Driver
If Driver is PPI

MatchedValuesPerPartPerAmp=AmpMatchedValues*Driver→PI2Part CF

If Probed is PPI

MatchedValuesPerPartPerAmp=MatchedValuesPerPartPerAmp*Probed→PI2Part CF

If the matched values come from Probed
If Probed is PPI

MatchedValuesPerPartPerAmp=AmpMatchedValues*Probed→PI2Part CF

If Driver is PPI

MatchedValuesPerPartPerAmp=MatchedValuesPerPartPerAmp*Driver→PI2Part CF

Partition Elimination and PI to Partition Correlation

In one embodiment, when there are conditions on the partitioning column that allows partition elimination, the PI2 Part CF that is computed based on the total NEP is adjusted according to the number of qualified partitions. This is accomplished by first computing a PartsPerVal which is the average number of partitions that a PI value is distributed across.

PartsPerVal=$V_{mc}$/PIValues

ValuesPerPart=$V_{mc}$/NEP $$\Rightarrow PI2PartCF = ValuesPerPart/PIValues$$
$$= V_{mc}/(NEP * PIValues)$$
$$= PartsPerVal/NEP$$

=>PartsPerVal=PI2Part CF*NEP

In one embodiment, PartsPerVal is the number of partitions in the context of NEP. The number of partitions that a value distributed across in the context of the qualified partitions is:

PartsPerVal(QualifiedParts)=max(1, QualifiedParts*PI2Part CF)

That means,
If (QualifiedParts*PI2 Part CF)<1

PartsPerVal(QualifiedParts)=1

=>PI2Part CF(QualifiedParts)=1/QualifiedParts

Otherwise,

PartsPerVal(QualifiedParts)=QualifiedParts*PI2Part CF $$\Rightarrow PI2PartCF(QualifiedParts) =$$
$$QualifiedParts * PIPartsCF / QualifiedParts = PI2PartCF$$

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for deriving join cost demographics for a binary join in a query, the binary join being between a first relation having a first join column and a second relation having a second join column, the method comprising:

determining a number ("$A_1$") of unique first join column values stored in each of a first plurality of units of storage;

determining a correlation factor ("$C_1$") related to the ratio of $A_1$ to the total number of unique values in the first join column;

determining a number ("$A_2$") of unique second join column values stored in each of a second plurality of units of storage;

determining a correlation factor ("$C_2$") related to the ratio of $A_2$ to the total number of unique values in the second join column;

adjusting $C_1$ and $C_2$ by a number of units of storage that are qualified to participate in the binary join;

determining a number ("$B_1$") of first join column values that will participate in the binary join based on $A_1$;

determining a number ("$B_2$") of second join column values that will participate in the binary join based on $A_2$;

selecting the smaller of $B_1$ and $B_2$ as $B_f$;

adjusting $B_f$ by $C_1$ and $C_2$; and storing $A_1$, $A_2$, and $B_f$ as join cost demographics for the two join columns.

2. The method of claim 1 where the unit of storage comprises the memory associated with one of a plurality of processing modules.

3. The method of claim 1 where the unit of storage comprises one of a plurality of partitions.

4. The method of claim 1 where determining $A_1$ comprises:
estimating $A_1$ using join column demographics.

5. The method of claim 1 where determining $A_1$ comprises:
estimating $A_1$ using a stochastic model.

6. The method of claim 1 further comprising:
adjusting $A_1$ by a single-table condition in the query.

7. The method of claim 1 further comprising:
adjusting $A_1$ by a factor selected from a group that includes $C_1$ and $C_2$.

8. A database system comprising:
one or more nodes;
a plurality of CPUs, each of the one or more nodes providing access to one or more CPUs;
a plurality of virtual processes, each of the one or more CPUs providing access to one or more virtual processes;
each virtual process configured to manage data, including rows from the set of database table rows, stored in one of a plurality of data-storage facilities;
a process configured to derive join cost demographics for a binary join in a query, the binary join being between a first relation having a first join column and a second relation having a second join column, by:

determining a number ("$A_1$") of unique first join column values stored in each of a first plurality of units of storage;

determining a correlation factor ("$C_1$") related to the ratio of $A_1$ to the total number of unique values in the first join column;

determining a number ("$A_2$") of unique second join column values stored in each of a second plurality of units of storage;

determining a correlation factor ("$C_2$") related to the ratio of $A_2$ to the total number of unique values in the second join column;

adjusting $C_1$ and $C_2$ by a number of units of storage that are qualified to participate in the binary join;

determining a number ("$B_1$") of first join column values that will participate in the binary join based on $A_1$;

determining a number ("$B_2$") of first join column values that will participate in the binary join based on $A_2$;

selecting the smaller of $B_1$ and $B_2$ as $B_f$;

adjusting $B_f$ by $C_1$ and $C_2$; and storing $A_1$, $A_2$, and $B_f$ as join cost demographics for the two join columns.

9. The database system of claim 8 where the unit of storage comprises the memory associated with one of a plurality of processing modules.

10. The database system of claim 8 where the unit of storage comprises one of a plurality of partitions.

11. The database system of claim 8 where determining $A_1$ comprises:
estimating $A_1$ using join column demographics.

12. The database system of claim 8 where determining $A_1$ comprises:
estimating $A_1$ using a stochastic model.

13. The database system of claim 8 further comprising:
adjusting $A_1$ by a single-table condition in the query.

14. The database system of claim 8 further comprising:
adjusting $A_1$ by a factor selected from a group that includes $C_1$ and $C_2$.

15. A computer program, stored in a tangible medium, for deriving join cost demographics for a binary join in a query, the binary join being between a first relation having a first join column and a second relation having a second join column, the program comprising executable instructions that cause a computer to:

determine a number ("$A_1$") of unique first join column values stored in each of a first plurality of units of storage;

determine a correlation factor ("$C_1$") related to the ratio of $A_1$ to the total number of unique values in the first join column;

determine a number ("$A_2$") of unique second join column values stored in each of a second plurality of units of storage;

determine a correlation factor ("$C_2$") related to the ratio of $A_2$ to the total number of unique values in the second join column;

adjust $C_1$ and $C_2$ by a number of units of storage that are qualified to participate in the binary join;

determine a number ("$B_1$") of first join column values that will participate in the binary join based on $A_1$;

determine a number ("$B_2$") of first join column values that will participate in the binary join based on $A_2$;

select the smaller of $B_1$ and $B_2$ as $B_f$;

adjust $B_f$ by $C_1$ and $C_2$; and store $A_1$, $A_2$, and $B_f$ as join cost demographics for the two join columns.

16. The computer program of claim 15 where the unit of storage comprises the memory associated with one of a plurality of processing modules.

17. The computer program of claim 15 where the unit of storage comprises one of a plurality of partitions.

18. The computer program of claim 15 where when determining $A_1$ the computer:

estimates $A_1$ using join column demographics.

19. The computer program of claim 15 where when determining $A_1$ the computer:

estimates $A_1$ using a stochastic model.

20. The computer program of claim 15 further comprising executable instructions that cause the computer to:
adjust $A_1$ by a single-table condition in the query.

21. The computer program of claim 15 further comprising executable instructions that cause the computer to:
adjust $A_1$ by a factor selected from a group that includes $C_1$ and $C_2$.

* * * * *